United States Patent
Folzenlogen et al.

(10) Patent No.: US 12,202,084 B2
(45) Date of Patent: Jan. 21, 2025

(54) ELECTRODE METAL PREHEATING FOR ARC START IMPROVEMENT

(71) Applicant: Lincoln Global, Inc., Santa Fe Springs, CA (US)

(72) Inventors: David Folzenlogen, Rocky River, OH (US); Michel Jany, Mont Saint Aignan (FR); Yann Rivet, Grand Couronne (FR); Telmo Agostinho, Contlans Saint Honorine (FR); Laurent Longinotti, Les Ageux (FR); Richard Sabatier, Lachapelle Saint-Pierre (FR); Loic Verwaerde, Saint Aubin Epinay (FR)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 613 days.

(21) Appl. No.: 17/386,773

(22) Filed: Jul. 28, 2021

(65) Prior Publication Data

US 2022/0297219 A1 Sep. 22, 2022

Related U.S. Application Data

(60) Provisional application No. 63/164,025, filed on Mar. 22, 2021.

(51) Int. Cl.
*B23K 9/18* (2006.01)
*B23K 9/10* (2006.01)
*B23K 9/12* (2006.01)

(52) U.S. Cl.
CPC ............ *B23K 9/186* (2013.01); *B23K 9/1093* (2013.01); *B23K 9/125* (2013.01)

(58) Field of Classification Search
CPC ....... B23K 9/1093; B23K 9/186; B23K 9/125
(Continued)

(56) References Cited

U.S. PATENT DOCUMENTS 4,675,494 A * 6/1987 Dilay .................. B23K 11/163
219/91.21
5,001,326 A * 3/1991 Stava ...................... B23K 9/00
219/130.21

(Continued)

FOREIGN PATENT DOCUMENTS

DE 25 45 075 A1 4/1977

OTHER PUBLICATIONS

Singh; "The Effect of Preheating of Electrode in Submerged Arc Welding of Stainless Steel;" International Research Journal of Engineering and Technology (IRJET); vol. 07, Issue: 04; Dated Apr. 2020; pp. 3564-3567.

*Primary Examiner* — Eric S Stapleton
*Assistant Examiner* — Yeong Juen Thong
(74) *Attorney, Agent, or Firm* — David J. Muzilla

(57) ABSTRACT

A system and method for submerged arc welding. The system advances a consumable welding electrode toward a workpiece, and then stops the advancement when the consumable electrode makes contact with the workpiece. The system provides a preheating current level through the consumable welding electrode proximate the workpiece while the consumable welding electrode is in contact with the workpiece during a preheating period of time to preheat the portion of the consumable welding electrode without establishing an arc. The system then retracts the consumable welding electrode from the workpiece and increases the preheating current level to a welding current level over an arc establishment period of time to establish an arc between the consumable welding electrode and the workpiece. The system then begins to form a weld by advancing the consumable welding electrode toward the workpiece again, resulting in melting the consumable welding electrode and depositing molten metal onto the workpiece.

10 Claims, 5 Drawing Sheets

(58) Field of Classification Search
USPC .................................................. 219/73, 76.1
See application file for complete search history.

(56) References Cited

U.S. PATENT DOCUMENTS

| | | |
|---|---|---|
| 2014/0217077 A1 | 8/2014 | Davidson et al. |
| 2015/0314398 A1 | 11/2015 | Peters et al. |
| 2016/0221105 A1* | 8/2016 | Henry .................... B23K 9/173 |
| 2017/0165778 A1 | 6/2017 | Hsu et al. |
| 2017/0175072 A1 | 6/2017 | Floto et al. |
| 2018/0297141 A1 | 10/2018 | Uecker et al. |
| 2018/0333798 A1 | 11/2018 | Uecker et al. |
| 2018/0354051 A1* | 12/2018 | Uecker ................ B23K 9/0953 |
| 2018/0354052 A1* | 12/2018 | Schartner ................ B23K 9/32 |
| 2020/0070274 A1 | 3/2020 | Stapp et al. |
| 2020/0346296 A1 | 11/2020 | Feldhausen |
| 2020/0376597 A1 | 12/2020 | Hoeger et al. |
| 2021/0060684 A1 | 3/2021 | Hoeger |
| 2021/0060685 A1 | 3/2021 | Massey, Jr. et al. |
| 2021/0114149 A1* | 4/2021 | Massey, Jr. .......... B23K 9/0956 |
| 2022/0143733 A1* | 5/2022 | Hoeger ................ B23K 9/1093 |

\* cited by examiner

ELECTRODE METAL PREHEATING FOR ARC START IMPROVEMENT

REFERENCE

This U.S. patent application claims priority to and the benefit of U.S. Provisional Patent Application Ser. No. 63/164,025 filed on Mar. 22, 2021, which is incorporated herein by reference in its entirety.

FIELD

Embodiments of the present invention relate to submerged arc welding (SAW). More specifically, embodiments of the present invention relate to systems and methods for providing a more consistent output and bead profile in submerged arc welding (SAW).

BACKGROUND

When welding at an extended stick-out distance in submerged arc welding (SAW), the electrode undergoes a significant amount of resistive heating. This changes the physical properties of the electrode while welding and leads to a less consistent output and bead profile. This is because existing modes of welding start welding when the electrode is still cold. This causes the resistivity of the electrode to change while it heats up during the start of the weld (e.g., for 3 to 5 seconds) and leads to inconsistency in the shape of the weld.

SUMMARY

A system and process is provided to resistively heat an electrode for submerged arc welding (SAW), using the welding power source, before starting to lay down a weld bead. The preheating process brings the consumable welding electrode up to a heated cherry red color before the weld is actually started, to improve the consistency of the weld. Using wire feed controls and touch sensing, the wire electrode can be fed until it touches the workpiece. Once the wire electrode touches the workpiece, the welding power supply can resistively heat the wire electrode until it is close to its steady state temperature. The amount of time and current needed to preheat the wire electrode depends on the wire size (e.g., the wire diameter), the wire material, and the stickout distance, in accordance with one embodiment. Once heated, the wire electrode is lifted off of the workpiece and an arc is struck as the current is brought up to a welding current level for welding.

In one embodiment, a method for use by a submerged arc welding (SAW) system is provided. The method includes advancing a consumable welding electrode (e.g., a consumable welding wire) toward a workpiece, then stopping the advancement of the consumable welding electrode in response to sensing when the tip of the consumable welding electrode makes contact with the workpiece. In one embodiment, the method further includes sensing when the tip of the consumable welding electrode makes contact with the workpiece at least by sensing a voltage level. The method further includes providing a preheating current level through a portion of the consumable welding electrode proximate the workpiece while the tip of the consumable welding electrode is in contact with the workpiece during a preheating period of time to preheat the portion of the consumable welding electrode without establishing an arc. The method also includes retracting the consumable welding electrode from the workpiece and increasing the preheating current level to a welding current level over an arc establishment period of time to establish an arc between the tip of the consumable welding electrode and the workpiece. The method further includes beginning to form a weld by advancing the consumable welding electrode toward the workpiece again, once the welding current level is reached, resulting in melting the tip of the consumable welding electrode and depositing molten metal onto the workpiece. In one embodiment, the method includes continuing to form the weld by moving the consumable welding electrode across the workpiece under an arc condition until the weld is complete, without having to further preheat the consumable welding electrode. The preheating period of time is based on an established relationship, electronically stored within the submerged arc welding system, between the preheating period of time and at least one of a material of the consumable welding electrode, a material of the workpiece, a diameter of the consumable welding electrode, and a stickout distance of the consumable welding electrode. In one embodiment, the method also includes the preheating period of time being subsequently manually adjusted by a user. The method further includes automatically reestablishing, within the submerged arc welding system, a new relationship between the preheating period of time and the at least one of the material of the consumable welding electrode, the material of the workpiece, the diameter of the consumable welding electrode, and the stickout distance of the consumable welding electrode in response to the preheating period of time being subsequently manually adjusted by the user. The preheating current level is based on an established relationship, electronically stored within the submerged arc welding system, between the preheating current level and at least one of a material of the consumable welding electrode, a material of the workpiece, a diameter of the consumable welding electrode, and a stickout distance of the consumable welding electrode. In one embodiment, the method also includes the preheating current level being subsequently manually adjusted by a user. The method further includes automatically reestablishing, within the submerged arc welding system, a new relationship between the preheating current level and the at least one of the material of the consumable welding electrode, the material of the workpiece, the diameter of the consumable welding electrode, and the stickout distance of the consumable welding electrode in response to the preheating current level being subsequently manually adjusted by the user. In one embodiment, the method also includes depositing a flux material over the tip of the consumable welding electrode proximate the workpiece once the arc is established.

In one embodiment, a submerged arc welding (SAW) system is provided. The system includes a welding power supply configured to supply at least a preheating current level and a welding current level, a welding torch, and a wire feeder configured to feed a consumable welding electrode to the welding torch. The system also includes a controller configured to communicate with and control at least the welding power supply and the wire feeder by providing a preheating process. The preheating process, as controlled by the controller, includes advancing the consumable welding electrode through the welding torch and toward a workpiece, and then stopping the advancing of the consumable welding electrode in response to determining when a tip of the consumable welding electrode makes contact with the workpiece. In one embodiment, the system includes sense leads, operatively connected to at least one of the wire feeder or the welding power supply, and configured to sense when the tip of the consumable welding electrode makes contact with the workpiece. The preheating process, as controlled by the controller, further includes providing the preheating current level, via a same welding circuitry of the welding power supply that is used for providing the welding current level, through a portion of the consumable welding electrode proximate the workpiece. This is done while the tip of the consumable welding electrode is in contact with the workpiece during a preheating period of time to preheat the portion of the consumable welding electrode without establishing an arc. The preheating process, as controlled by the controller, also includes retracting the consumable welding electrode from the workpiece and increasing the preheating current level to the welding current level over an arc establishment period of time to establish an arc between the tip of the consumable welding electrode and the workpiece. Then the system is configured to form a weld by advancing the consumable welding electrode toward the workpiece again, once the welding current level is reached, resulting in melting the tip of the consumable welding electrode and depositing molten metal onto the workpiece. In one embodiment, the system includes a robot configured to move the welding torch across the workpiece under an arc condition to continue to form the weld until the weld is complete, without having to further preheat the consumable welding electrode. The preheating period of time is based on an established relationship, electronically stored within the controller, between the preheating period of time and at least one of a material of the consumable welding electrode, a material of the workpiece, a diameter of the consumable welding electrode, and a stickout distance of the consumable welding electrode. In one embodiment, the system includes a user interface configured to allow the preheating period of time to be subsequently manually adjusted by a user. The controller is configured to automatically reestablish a new relationship between the preheating period of time and the at least one of the material of the consumable welding electrode, the material of the workpiece, the diameter of the consumable welding electrode, and the stickout distance of the consumable welding electrode in response to the preheating period of time being subsequently manually adjusted by the user. The preheating current level is based on an established relationship, electronically stored within the controller, between the preheating current level and at least one of a material of the consumable welding electrode, a material of the workpiece, a diameter of the consumable welding electrode, and a stickout distance of the consumable welding electrode. In one embodiment, the user interface is configured to allow the preheating current level to be subsequently manually adjusted by a user. The controller is configured to automatically reestablish a new relationship between the preheating current level and the at least one of the material of the consumable welding electrode, the material of the workpiece, the diameter of the consumable welding electrode, and the stickout distance of the consumable welding electrode in response to the preheating current level being subsequently manually adjusted by the user. In one embodiment, the system further includes a flux supply configured to deposit a flux material over the tip of the consumable welding electrode proximate the workpiece once the arc is established.

Numerous aspects of the general inventive concepts will become readily apparent from the following detailed description of exemplary embodiments, from the claims, and from the accompanying drawings.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
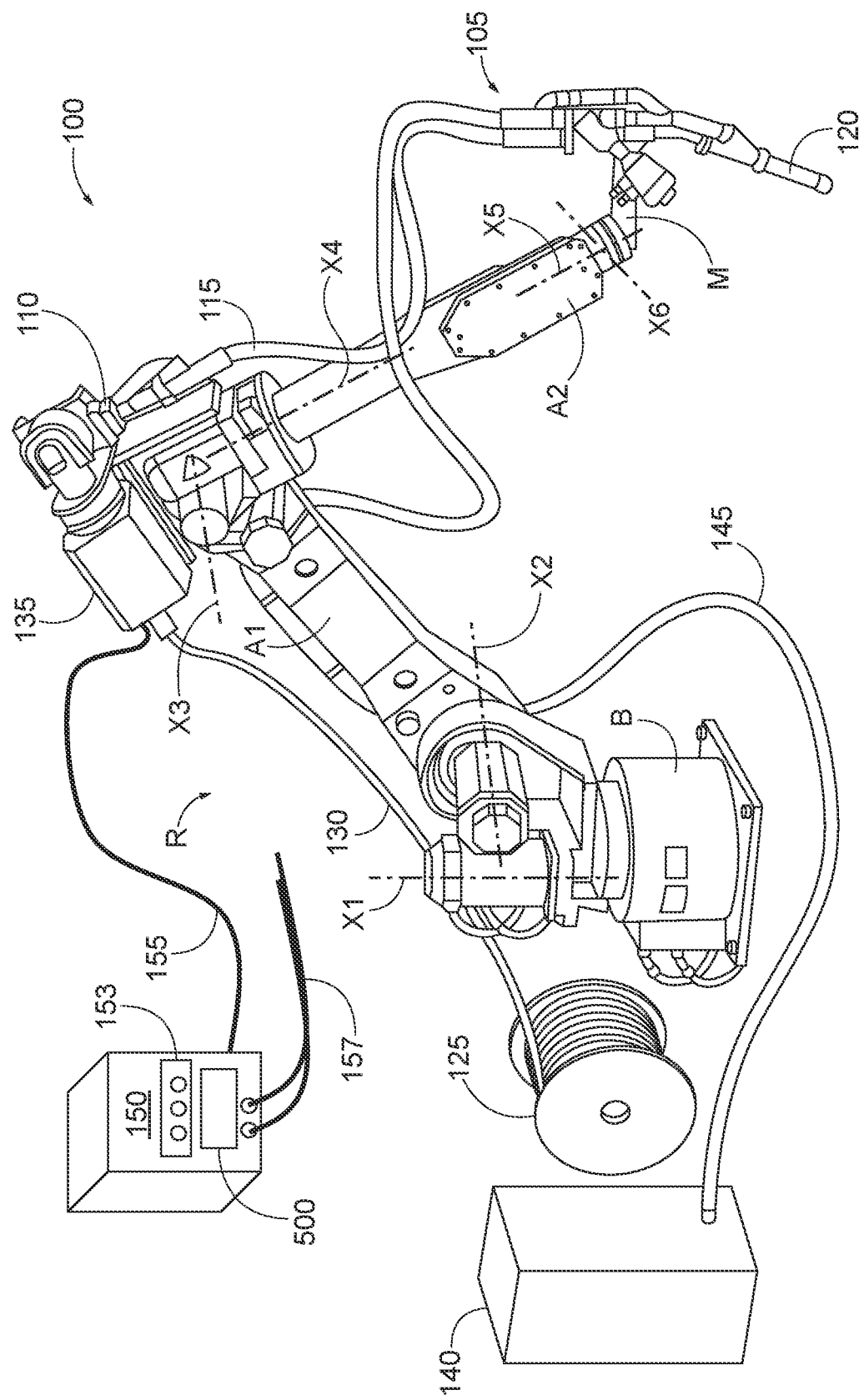
FIG. 1 illustrates one embodiment of a submerged arc welding (SAW) system.

Embodiments of the present invention may include a submerged arc welding (SAW) system programmed to provide a process or method for preheating a welding wire electrode before welding. The process or method includes advancing a consumable welding electrode toward a workpiece, and stopping advancement of the consumable welding electrode upon sensing when a tip of the consumable welding electrode makes contact with the workpiece. A preheating current level is provided through a portion of the consumable welding electrode proximate the workpiece while the tip of the consumable welding electrode is in contact with the workpiece during a preheating period of time. The consumable welding electrode is retracted from the workpiece and the preheating current level is increased to a welding current level over an arc establishment period of time to establish an arc between the tip of the consumable welding electrode and the workpiece. Welding can begin by advancing the consumable welding electrode toward the workpiece once the welding current level is reached, resulting in melting the tip of the consumable welding electrode and depositing molten metal onto the workpiece.

The examples and figures herein are illustrative only and are not meant to limit the subject invention, which is measured by the scope and spirit of the claims. Referring now to the drawings, wherein the showings are for the purpose of illustrating exemplary embodiments of the subject invention only and not for the purpose of limiting same, FIG. 1 illustrates one embodiment of a submerged arc welding (SAW) system 100 which puts the claimed invention of the present application in context.

Referring to FIG. 1, a perspective view of the SAW system 100 includes a robot R. The robot R has a base B, a first arm A1, and a second arm A2. The first arm A1 is rotatably connected to the base B and is configured to rotate about a first axis X1 and a second axis X2. The second arm A2 is rotatably connected to the first arm A1 and is configured to rotate about a third axis X3 and a fourth axis X4. In the illustrated embodiment, the robot R further includes a torch mounting bracket M, connected to the second arm A2, that articulates about a fifth axis X5 and a sixth axis X6. The robot R is exemplary, and the submerged arc welding system

100 may be employed with any robot or robotic arm, in accordance with various embodiments.

The SAW system 100 includes a welding torch 105 comprising a power block 110, a welding torch cable 115, and a nozzle 120. The welding torch cable 115 may include an optional liner. In an alternative embodiment, the welding torch includes a power block, a torch power connection, and a wire conduit and welding cables configured to handle required amperage connected to the power block. In one embodiment, the welding torch 105 weighs less than 20 kilo-grams. The welding torch 105 is connected to the second arm A2 of the robot R by the torch mounting bracket M. In an alternative embodiment, the welding torch 105 is directly connected to the second arm A2.

A wire supply 125 supplies a welding wire 130 (a consumable welding electrode) to a wire feeder 135, which feeds the welding wire 130 through the welding torch cable 115 of the welding torch 105 and subsequently through the nozzle 120. That is, the wire feeder 135 moves the welding wire 130 from the wire supply 125 along a wire path through the nozzle 120 of the welding torch 105, where the wire path includes the wire feeder 135 and the welding torch cable 115. The wire supply 125 is shown as a single spool of welding wire, but it should be understood that the wire supply 125 may include two or more wire supplies, such as a first spool of welding wire and a second spool of welding wire. Where two or more wire supplies are employed, a corresponding number of wire feeders and welding torch cables may be employed. In other alternative embodiments, the wire supply 125 may take the form of a reel, a spool, a drum, or a box container.

Figure 5:
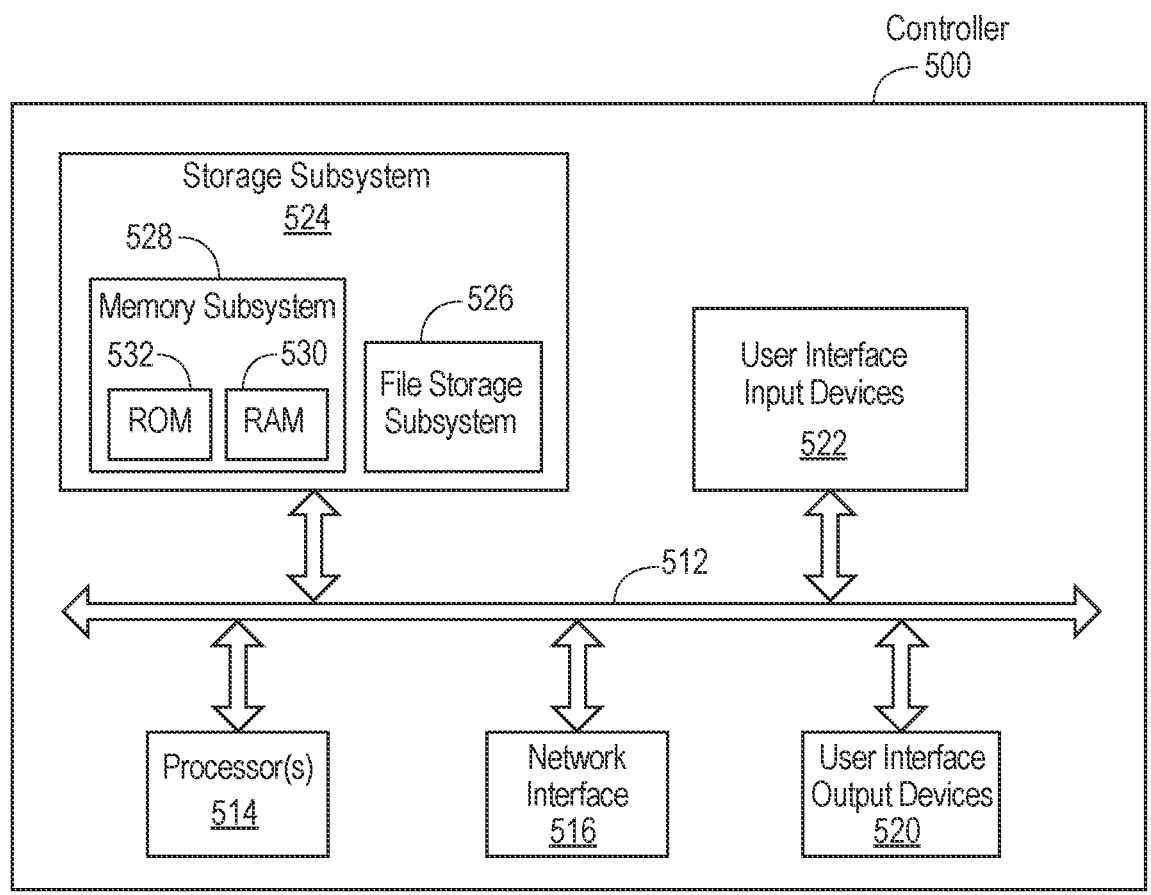
FIG. 5 illustrates a block diagram of an example embodiment of a controller that can be used, for example, in the submerged arc welding (SAW) system of FIG. 1.

The SAW system 100 includes a welding power supply 150 having a controller 500. In the embodiment of FIG. 1, the welding power supply 150 provides electrical preheating and welding power to the wire feeder 135 via a welding cable 155. The electrical preheating and welding power are provided to the power block 110 via the wire feeder to provide the electrical preheating and welding power to the welding torch 105 (i.e., to apply the electrical preheating or welding power to the welding wire 130 (consumable welding electrode) being fed through the welding torch 105). In accordance with one embodiment, the controller 500 controls the welding power source 150 and sends commands to the wire feeder 135. For example, in one embodiment, the controller 500 provides a process for pre-heating a portion of the welding wire (consumable welding electrode) before actual welding begins. An example embodiment of a controller is shown in FIG. 5 herein. The welding power supply 150 may be, for example, an inverter-based power supply, in accordance with one embodiment. In accordance with one embodiment, the same circuitry within the welding power supply 150 is used to produce both the electrical preheating power (at a preheating current level) and the electrical welding power (e.g., at a welding current level) under the control of the controller 500. There is no need for a separate heating circuitry.

The welding power supply 150 includes a user interface 153, and sense leads 157 are provided. The user interface 153 is configured to allow a user to make various parameter selections for the welding power supply 153. For example, in one embodiment, the user interface is configured to allow a preheating period of time (discussed later herein) to be manually adjusted by the user. The user interface is also configured to allow a preheating current level (discussed later herein) to be manually adjusted by the user. The sense leads 157 are operatively connected to at least one of the wire feeder or the welding power supply, in accordance with various embodiments, and are configured to sense when the tip of the consumable welding electrode 130 makes contact with the workpiece. Other means for sensing when the tip of the consumable welding electrode 130 makes contact with the workpiece are possible as well, in accordance with other embodiments. For example, a camera may be used to view when contact is made.

In FIG. 1, the wire supply 125 is not directly mounted to the robot R. Instead, the wire supply 125 is located distal from the robot R. The wire supply 125 may be located any distance from the robot R, such that it may be placed in a position suitable for a particular environment. In many known welding environments, the wire supply 125 will be located between about 1 meter to about 50 meters from the robot R.

The wire feeder 135 is shown mounted to the first arm A1 of the robot R, behind the third and fourth axes. In alternative embodiments, the wire feeder 135 may be mounted to the second arm A2 of the robot R, or placed in a location not connected to the robot R. Additionally, the SAW system 100 includes a flux supply 140 that supplies flux through a flux line 145 to the welding torch 105. The flux includes granular fusible flux particles. The flux particles may include lime, silica, manganese oxide, calcium fluoride, or a combination thereof. The flux may also include flux fines (i.e., small particles) and dust of the same or similar composition as the flux particles.

In one embodiment, the flux supply 140 includes a vacuum unit (not shown) having a hose extending adjacent the nozzle 120. The hose and the vacuum unit are configured to use suction to collect flux particles that pass through the nozzle 120 and remain on a surface. In one embodiment, the flux supply 140 includes a pressurized flux delivery system that employs pressurized air to push or otherwise move flux through the flux line 145, where the flux line 145 is directly connected to the welding torch 105. The flux supply 140 is shown as a feed tank, such as a pressurized feed tank. There is no intervening gravity hopper disposed between the flux supply 140 and the welding torch 105. That is, the pressurized flux delivery system moves the flux along a flux path from the flux supply 140 to the nozzle 120 of the welding torch 105, where the flux path does not include a gravity hopper.

The flux supply 140 is not directly mounted to the robot R. Instead, the flux supply 140 is located distal from the robot R. The flux supply 140 may be located any distance from the robot R, such that it may be placed in a position suitable for a particular environment. In many welding environments, the flux supply 140 will be located between about 1 meter to about 20 meters from the robot R. The SAW system 100 may also include a flux recycling system (not shown) for recycling flux that is discharged through the nozzle 120. The flux recycling system may include one or more vacuum tubes that lead back to the flux supply 140 or to the flux line 145, thereby allowing discharged flux to be reused.

Figure 2:
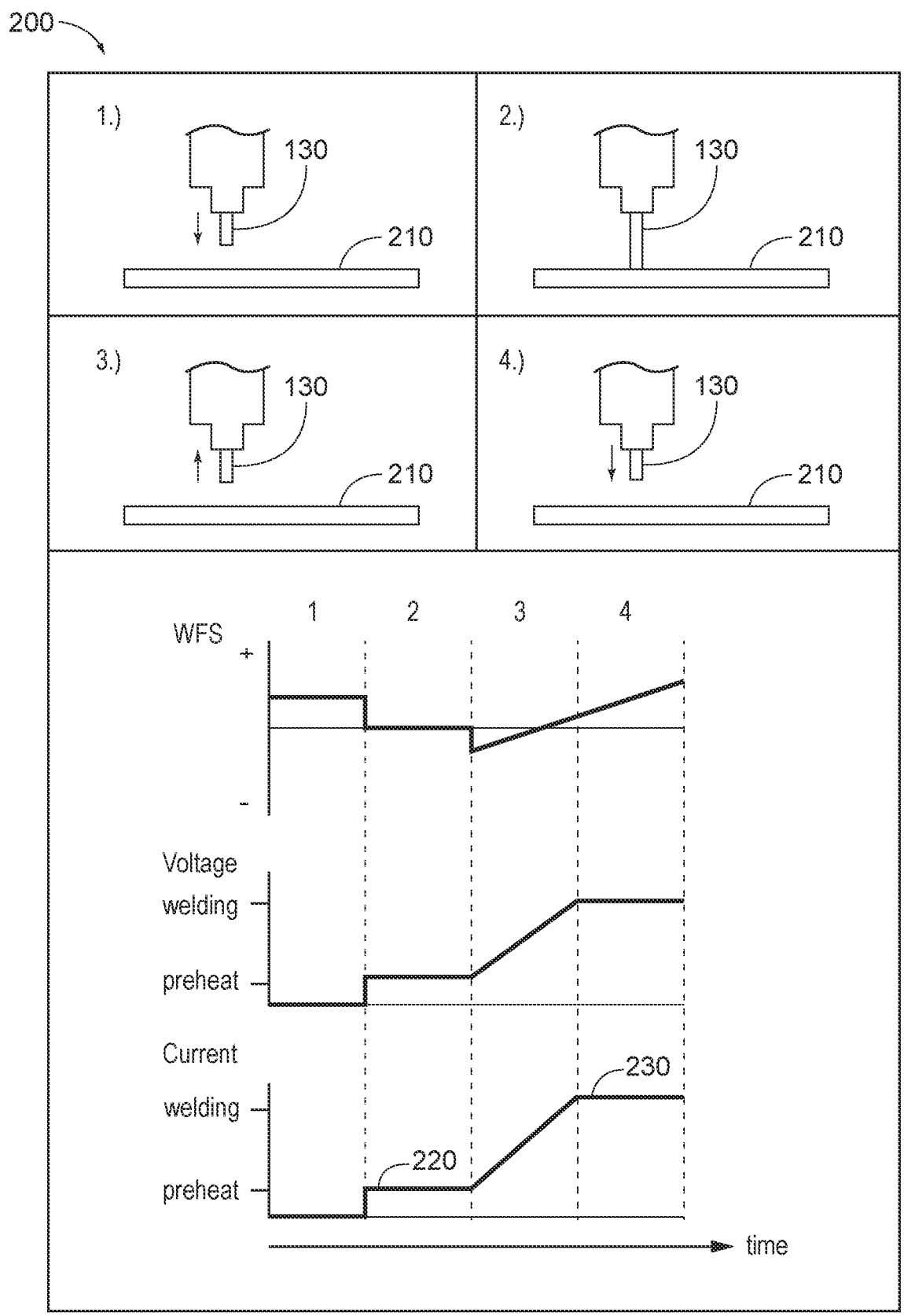
FIG. 2 graphically illustrates one embodiment of a process for pre-heating a consumable welding electrode using the submerged arc welding (SAW) system of FIG. 1.

FIG. 2 graphically illustrates one embodiment of a process 200 for resistively pre-heating a consumable welding electrode using the submerged arc welding (SAW) system 100 of FIG. 1. The process essentially involves a transition between four stages (1, 2, 3, and 4 as seen in FIG. 2). FIG. 2 shows the relation of the consumable welding electrode 130 to a workpiece 210 in each of the stages. FIG. 2 also shows graphs of wire feed speed (WFS), voltage, and current in each of the stages.

In stage 1, the wire electrode 130 (consumer welding electrode) is advanced (via the wire feeder 135) through the welding torch 105 toward the workpiece 210 to be welded during a submerged arc welding process. At stage 2, the tip of the wire electrode 130 makes contact with the workpiece 210 and the wire electrode 130 is no longer advanced by the wire feeder 135. An electrical short circuit is created when the tip of the wire electrode 130 makes contact with the workpiece 210. In accordance with one embodiment, a touch sensing technique is used to determine when the wire electrode 130 shorts to the workpiece 210 (e.g., a voltage level sensing technique using the sense leads 157 electrically connected to the wire electrode and the workpiece).

Figure 3:
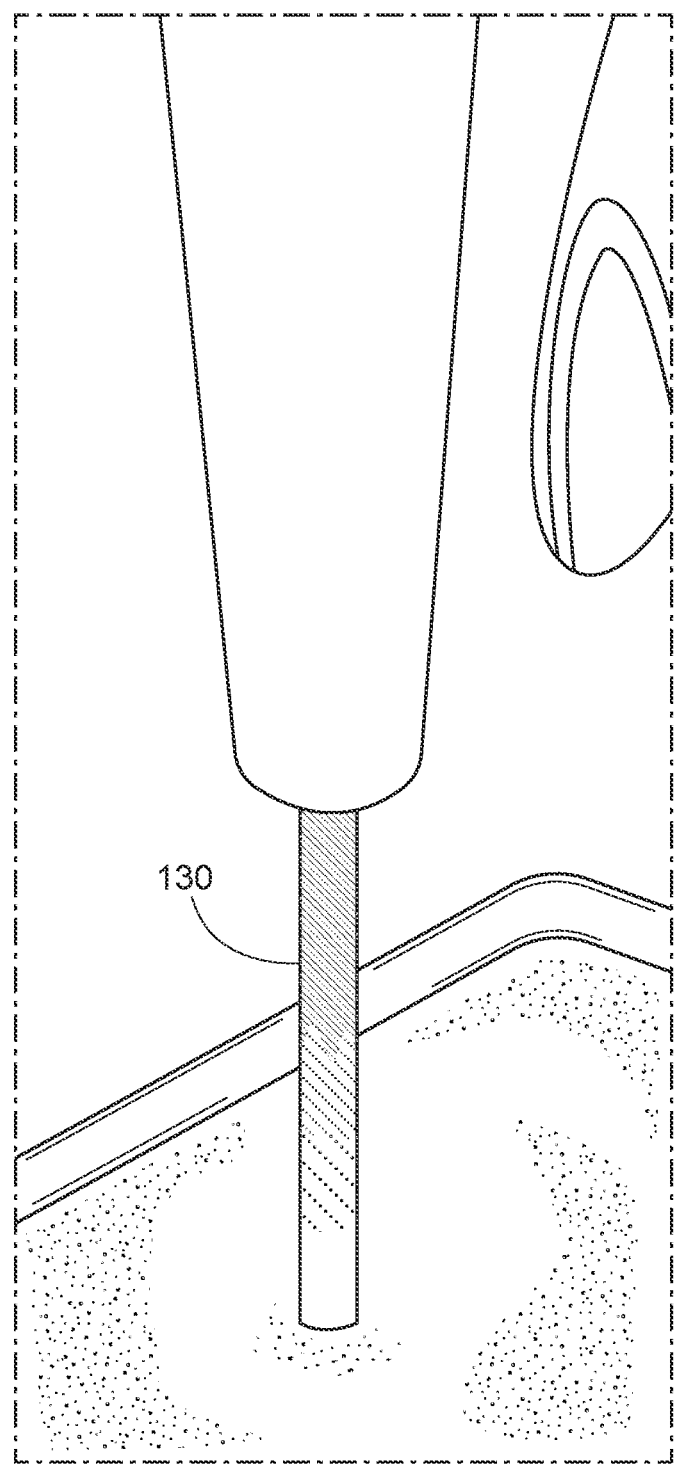
FIG. 3 illustrates one embodiment of a consumable welding electrode that is being pre-heated using the submerged arc welding (SAW) system of FIG. 1 and the process of FIG. 2.

The system 100 controls the wire feed speed and the current flowing through the portion of the wire electrode 130 near the workpiece 210 (e.g., via the controller 500 controlling the welding power supply 150 and the wire feeder 135) to provide a preheating current level 220 over a preheating period of time (i.e., the time duration of stage 2). The portion of the wire electrode referred to is between a contact tip in the welding torch 105 and the workpiece 210, in accordance with one embodiment, and constitutes the stickout of the wire electrode. The amount of time and current needed to preheat the portion of the wire electrode depends on the wire size (e.g., the wire diameter), the wire material, and the stickout distance or length. During the preheating period of time of stage 2, the portion of the wire electrode 130 (the stickout portion) near the workpiece 210 heats up (i.e., increases towards a steady state temperature). FIG. 3 illustrates one embodiment of a consumable welding electrode 130 that is being pre-heated using the submerged arc welding (SAW) system 100 of FIG. 1 and the process 200 of FIG. 2.

The preheating period of time is based on an established relationship between the preheating period of time and at least one of a material of the consumable welding electrode, a material of the workpiece, a diameter of the consumable welding electrode, and a stickout distance of the consumable welding electrode. The established relationship is electronically stored as data within the submerged arc welding system 100 (e.g., via a look-up-table in the controller 500), in accordance with one embodiment, or as a mathematical formula, in accordance with another embodiment. If the user decides that the established relationship is not adequate, the user can manually adjust the preheating period of time (e.g., via the user interface 153). Upon completing the manual adjustment, a new relationship is automatically reestablished by the controller 500 based on the newly adjusted preheating period of time, in accordance with one embodiment. The system 100 can be reset to the original relationship (factory reset settings), if desired, via the user interface 153.

Similarly, the preheating current level 220 is based on an established relationship between the preheating current level 220 and at least one of a material of the consumable welding electrode, a material of the workpiece, a diameter of the consumable welding electrode, and a stickout distance of the consumable welding electrode. The established relationship is electronically stored as data within the submerged arc welding system 100 (e.g., via a look-up-table in the controller 500), in accordance with one embodiment, or as a mathematical formula, in accordance with another embodiment. If the user decides that the established relationship is not adequate, the user can manually adjust the preheating current level 220 (e.g., via the user interface 153). Upon completing the manual adjustment, a new relationship is automatically reestablished by the controller 500 based on the newly adjusted preheating current level, in accordance with one embodiment. The system 100 can be reset to the original relationship (factory reset settings), if desired, via the user interface 153.

After the preheating period of time 220 of stage 2, in stage 3, the current is increased (e.g., ramped up) to a welding current level 230 over an arc establishment period of time (i.e., the time duration of stage 3) in which the wire electrode 130 is retracted and an arc is established between the tip of the wire electrode 130 and the workpiece 210. Then, in stage 4, the submerged arc welding process begins once the current increases to the welding current level 230 (i.e., at the beginning of stage 4). The wire electrode 130 is advanced toward the workpiece 210 as the tip of the wire electrode 130 is consumed (melted), depositing molten metal onto the workpiece 210. The robot R moves the welding torch 105 along the workpiece 210 to form a weld bead. Since this is a submerged arc welding process, the tip of the wire electrode 130 (and the arc) are buried by a flux material during welding (via the flux supply 140). In accordance with one embodiment, the flux material is provided shortly after arc initiation (e.g., at the beginning of stage 4). In general, the timing, the wire feed speeds, the currents, and the voltages of the four stages shown in FIG. 2 are controlled by the controller 500, in accordance with one embodiment.

Figure 4:
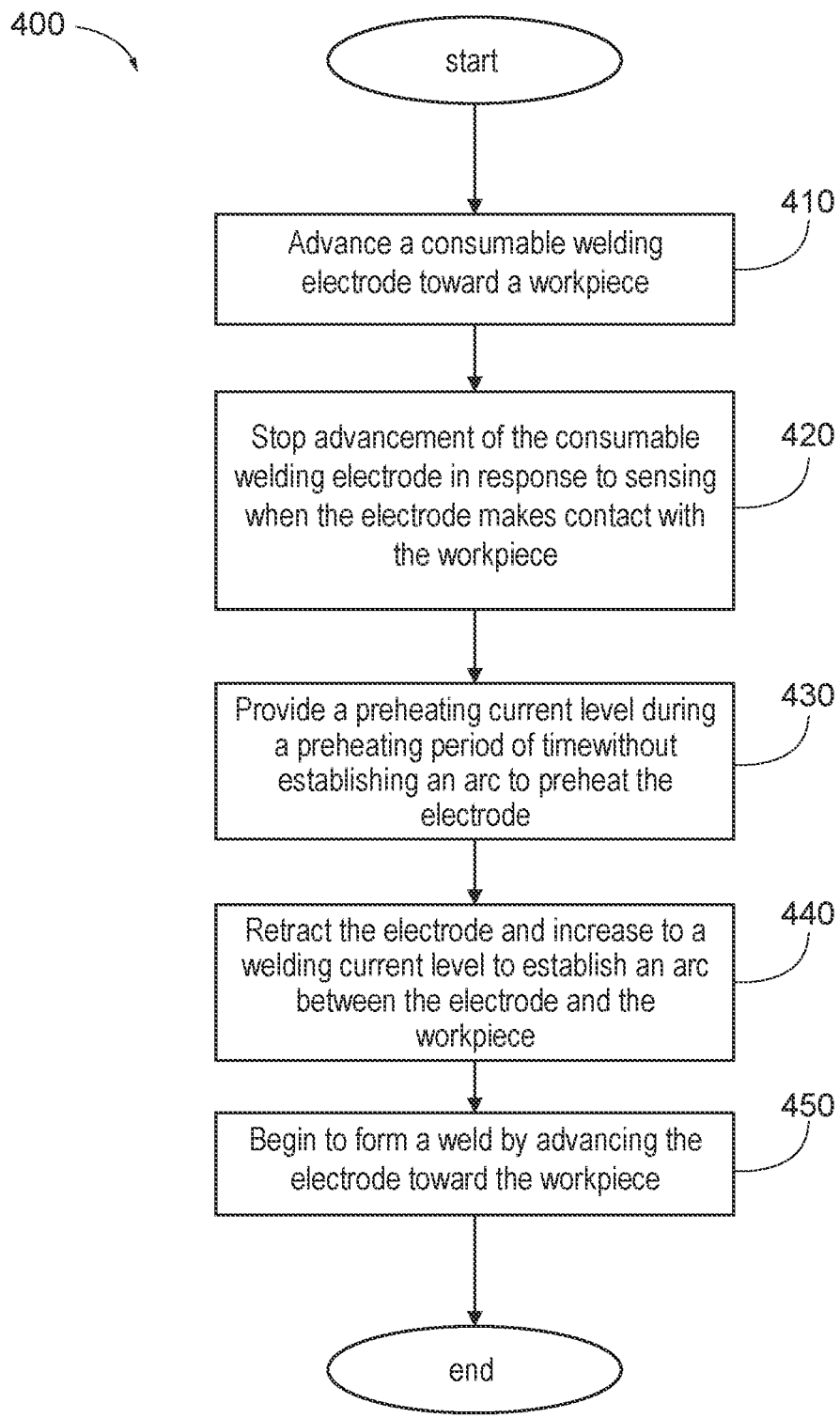
FIG. 4 illustrates a flowchart of a method which reflects the process of FIG. 2.

FIG. 4 illustrates a flowchart of a method 400 which reflects the process 200 of FIG. 2. At block 410 of the method 400, the consumable welding electrode 130 is advanced toward the workpiece 210, for example, through the welding torch 105. At block 420, advancement of the consumable welding electrode 130 is stopped in response to sensing when a tip of the consumable welding electrode 130 makes contact with the workpiece 210. At block 430, a preheating current level 220 is provided through a portion of the consumable welding electrode 130 proximate the workpiece 210 while the tip of the consumable welding electrode 130 is in contact with the workpiece 210 during a preheating period of time to preheat the portion of the consumable welding electrode 130 without establishing an arc. At block 440, the consumable welding electrode 130 is retracted from the workpiece 210 and the preheating current level 220 is increased to a welding current level 230 over an arc establishment period of time to establish an arc between the tip of the consumable welding electrode 130 and the workpiece 210. At block 450, a weld is begun to be formed by advancing the consumable welding electrode 130 toward the workpiece once the welding current level 230 is reached, resulting in melting the tip of the consumable welding electrode 130 and depositing molten metal onto the workpiece 210. Subsequently, the weld continues to be formed by moving the consumable welding electrode 130 across the workpiece 210 under an arc condition until the weld is complete, without having to further preheat the consumable welding electrode 130.

FIG. 5 illustrates a block diagram of an example embodiment of the controller 500 that can be used, for example, in the submerged arc welding (SAW) system 100 of FIG. 1. For example, the controller 500 is located within the welding power supply 150, in accordance with one embodiment, as shown in FIG. 1. The controller 500 may be located externally to the welding power supply 150, in another embodiment. Another similar controller may be used as a robot controller for the robot R. Referring to FIG. 5, the controller 500 includes at least one processor 514 (e.g., a microprocessor, a central processing unit, a graphics processing unit) which communicates with a number of peripheral devices via bus subsystem 512. These peripheral devices may include a storage subsystem 524, including, for example, a memory subsystem 528 and a file storage subsystem 526, user interface input devices 522, user interface output devices 520, and a network interface subsystem 516. The input and output devices allow user interaction with the controller 500. Network interface subsystem 516 provides an interface to outside networks and is coupled to corresponding interface devices in other devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the controller 500 or onto a communication network.

User interface output devices 520 may include a display subsystem, a printer, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 500 to the user or to another machine or computer system.

Storage subsystem 524 stores programming and data constructs that provide some or all of the functionality described herein. For example, computer-executable instructions and data are generally executed by processor 514 alone or in combination with other processors. Memory 528 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a solid state drive, a floppy disk drive along with associated removable media, a CD-ROM drive, an optical drive, or removable media cartridges. The computer-executable instructions and data implementing the functionality of certain embodiments may be stored by file storage subsystem 526 in the storage subsystem 524, or in other machines accessible by the processor(s) 514.

Bus subsystem 512 provides a mechanism for letting the various components and subsystems of the controller 500 communicate with each other as intended. Although bus subsystem 512 is shown schematically as a single bus, alternative embodiments of the bus subsystem may use multiple buses.

The controller 500 can be of varying types. Due to the ever-changing nature of computing devices and networks, the description of the controller 500 depicted in FIG. 5 is intended only as a specific example for purposes of illustrating some embodiments. Many other configurations of a controller are possible, having more or fewer components than the controller 500 depicted in FIG. 5.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of the appended claims, which satisfy the statutory subject matter requirements of 35 U.S.C. § 101. The above description of specific embodiments has been given by way of example. From the disclosure given, those skilled in the art will not only understand the general inventive concepts and attendant advantages, but will also find apparent various changes and modifications to the structures and methods disclosed. It is sought, therefore, to cover all such changes and modifications as fall within the spirit and scope of the general inventive concepts, as defined by the appended claims, and equivalents thereof.

What is claimed is:

1. A submerged arc welding system, the system comprising:
    a welding power supply configured to supply at least a preheating current level and a welding current level;
    a welding torch;
    a wire feeder configured to feed a consumable welding electrode to the welding torch; and
    a controller configured to communicate with and control, via computer-executable instructions executed by at least one processor of the controller, at least the welding power supply and the wire feeder to perform the ordered steps of:
    (a) advance the consumable welding electrode through the welding torch and toward a workpiece via the wire feeder and stop advancement of the consumable welding electrode, via the wire feeder, in response to determining, via sense leads, when a tip of the consumable welding electrode makes contact with the workpiece,
    (b) provide the preheating current level, via a same welding circuitry of the welding power supply that is used for providing the welding current level, through a portion of the consumable welding electrode proximate the workpiece while the tip of the consumable welding electrode is in contact with the workpiece during a preheating period of time to preheat the portion of the consumable welding electrode without establishing an arc,
    (c) retract the consumable welding electrode, via the wire feeder, from the workpiece and increase the preheating current level to the welding current level, via the welding power supply, over an arc establishment period of time to establish the arc between the tip of the consumable welding electrode and the workpiece, and
    (d) begin to form a weld by advancing the consumable welding electrode toward the workpiece again, via the wire feeder, once the welding current level is reached, resulting in melting the tip of the consumable welding electrode and depositing molten metal onto the workpiece.

2. The system of claim 1, further comprising a robot configured to move the welding torch across the workpiece under an arc condition to continue to form the weld at the welding current level provided by the welding power supply until the weld is complete, without having to further preheat the consumable welding electrode at the preheating current level provided by the welding power supply.

3. The system of claim 1, wherein the preheating period of time is based on an established relationship, electronically stored within the controller, between the preheating period of time and at least one of a material of the consumable welding electrode, a material of the workpiece, a diameter of the consumable welding electrode, and a stickout distance of the consumable welding electrode.

4. The system of claim 3, further comprising a user interface configured to allow the preheating period of time to be subsequently manually adjusted by a user.

5. The system of claim 4, wherein the controller is configured to, via the computer-executable instructions executed by the at least one processor, automatically reestablish a new relationship between the preheating period of time and the at least one of the material of the consumable welding electrode, the material of the workpiece, the diameter of the consumable welding electrode, and the stickout distance of the consumable welding electrode in response to the preheating period of time being subsequently manually adjusted by the user.

6. The system of claim 1, wherein the preheating current level is based on an established relationship, electronically stored within the controller, between the preheating current level and at least one of a material of the consumable welding electrode, a material of the workpiece, a diameter of the consumable welding electrode, and a stickout distance of the consumable welding electrode.

7. The system of claim 6, further comprising a user interface configured to allow the preheating current level to be subsequently manually adjusted by a user.

8. The system of claim 7, wherein the controller is configured to, via the computer-executable instructions executed by the at least one processor, automatically reestablish a new relationship between the preheating current level and the at least one of the material of the consumable welding electrode, the material of the workpiece, the diameter of the consumable welding electrode, and the stickout distance of the consumable welding electrode in response to the preheating current level being subsequently manually adjusted by the user.

9. The system of claim 1, further comprising a flux supply configured to deposit a flux material over the tip of the consumable welding electrode proximate the workpiece once the arc is established.

10. The system of claim 1, further comprising the sense leads, operatively connected to at least one of the wire feeder or the welding power supply, and configured to sense when the tip of the consumable welding electrode makes contact with the workpiece.

* * * * *